(12) United States Patent
Fink et al.

(10) Patent No.: US 10,628,525 B2
(45) Date of Patent: Apr. 21, 2020

(54) NATURAL LANGUAGE PROCESSING OF FORMATTED DOCUMENTS

(71) Applicant: INTERNATIONAL BUSINESS MACHINES CORPORATION, Armonk, NY (US)

(72) Inventors: Patrick W. Fink, Charlotte, NC (US); Kristin E. McNeil, Charlotte, NC (US); Philip E. Parker, York, SC (US); David B. Werts, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/597,212

(22) Filed: May 17, 2017

(65) Prior Publication Data

US 2018/0336181 A1 Nov. 22, 2018

(51) Int. Cl.
| | |
|---|---|
| *G06F 17/27* | (2006.01) |
| *G06F 17/21* | (2006.01) |
| *G06K 9/00* | (2006.01) |
| *G06N 20/00* | (2019.01) |

(52) U.S. Cl.
CPC ........ *G06F 17/2785* (2013.01); *G06F 17/214* (2013.01); *G06F 17/271* (2013.01); *G06K 9/00442* (2013.01); *G06K 2209/01* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,014,458 | A | * | 1/2000 | Wang ................ G06K 9/00442 382/176 |
| 6,088,478 | A | * | 7/2000 | Davies .................. G06T 9/005 382/168 |
| 6,912,555 | B2 | | 6/2005 | Lemon et al. |
| 7,389,306 | B2 | | 6/2008 | Schuetze et al. |
| 7,702,508 | B2 | | 4/2010 | Bennett |
| 8,346,756 | B2 | | 1/2013 | Polanyi et al. |

(Continued)

OTHER PUBLICATIONS

IBM: List of IBM Patents or Patent Applications Treated as Related (Appendix P), Sep. 18, 2017, pp. 1-2.

(Continued)

*Primary Examiner* — Richa Mishra
(74) *Attorney, Agent, or Firm* — Jordan T. Schiller (57) ABSTRACT

Detecting and incorporating formatting characteristics within natural language processing analytics. Source documents are ingested and the markup formatting language is identified by the program. Once identified, the markup language is parsed and examined for formatting characteristics, embedded notes, comments and other metadata. The formatting characteristics of the plain text are extracted, along with the plain text, and converted into a common analysis structure (CAS), or CAS-equivalent structure, which annotates the natural language text together with its respective formatting characteristics. The CAS or CAS-equivalent structures are stored and sent to a natural language processing pipeline for further analysis via complex algorithms and rules. The natural language processing results data are curated to reflect meaningful analysis of the extracted CAS or CAS-equivalent structure.

11 Claims, 5 Drawing Sheets

(56) References Cited

U.S. PATENT DOCUMENTS

| | | |
|---|---|---|
| 9,053,085 B2 | 6/2015 | Dubbels |
| 2006/0161559 A1 | 7/2006 | Bordawekar et al. |
| 2010/0163316 A1 | 7/2010 | Chang et al. |
| 2010/0235353 A1 | 9/2010 | Warnock et al. |
| 2011/0099184 A1 | 4/2011 | Symington |
| 2014/0082003 A1 | 3/2014 | Feldman et al. |
| 2014/0164407 A1* | 6/2014 | Dubbels .............. G06F 17/2705 707/755 |
| 2014/0164408 A1 | 6/2014 | Dubbels |
| 2015/0033116 A1* | 1/2015 | McKinney .......... G06F 17/2247 715/239 |
| 2015/0088888 A1 | 3/2015 | Brennan et al. |
| 2017/0052943 A1* | 2/2017 | Owens ................. G06F 17/248 |
| 2017/0177715 A1* | 6/2017 | Chang ................. G06F 17/2785 |

OTHER PUBLICATIONS

Fink et al., U.S. Appl. No. 15/706,788, filed Sep. 18, 2017, titled "Natural Language Processing of Formatted Documents," pp. 1-42.

Mell et al., "The NIST Definition of Cloud Computing," National Institute of Standards and Technology, U.S. Department of Commerce, Special Publication 800-145, Sep. 2011, pp. 1-7.

* cited by examiner

NATURAL LANGUAGE PROCESSING OF FORMATTED DOCUMENTS

BACKGROUND

The present invention relates generally to the field of Natural Language Processing (NLP), and more particularly to text analytics.

NLP is a field of computer science, artificial intelligence, and linguistics concerned with the interactions between computers and human languages. NLP utilizes preloaded keywords, word syntax, and pattern recognition techniques to analyze and extract meaning from natural human language. Amongst other things, NLP allows computing devices to draw associations and trends amongst data written in different words, formats, and structures by tapping into the fundamental patterns and characteristics with which humans use natural language. For this reason, along with the speed at which a computing device can process data, computer based NLP has become one of the most powerful tools for analyzing large amounts of data. However, current technology limits NLP analysis to plain text while missing the metadata (i.e. formatting characteristics) thereof.

BRIEF SUMMARY

According to an embodiment of the present invention, a method for processing natural language text on a computer determines that a natural language text is associated with one or more formatting characteristics. The method determines a span of the natural language text corresponding to the one or more formatting characteristics, and further generates a data structure for storage in memory. The data structure includes at least one of the one or more formatting characteristics, and together with a corresponding span of the natural language text.

According to a further embodiment of the invention, a computer system for processing natural language text on a computer includes one or more computer devices each having one or more processors and one or more tangible storage devices. The system further includes a program embodied on at least one of the one or more storage devices. The program includes a set of program instructions for execution by the one or more processors. The program instructions cause the one or more processors to execute a method. The method determines a span of the natural language text corresponding to the one or more formatting characteristics, and further generates a data structure for storage in memory. The data structure includes at least one of the one or more formatting characteristics, and together with a corresponding span of the natural language text.

According to a further embodiment of the invention, a computer program product for processing natural language text on a computer includes program code embodied on a non-transitory tangible storage device. The program code is executable by a processor of a computer to perform a method. The method for processing natural language text on a computer determines that a natural language text is associated with one or more formatting characteristics. The method determines a span of the natural language text corresponding to the one or more formatting characteristics, and further generates a data structure for storage in memory. The data structure includes at least one of the one or more formatting characteristics, and together with a corresponding span of the natural language text.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Embodiments of the present invention disclose a method, computer program product, and system for the inclusion of formatting characteristics when analyzing plain text using NLP.

A traditional NLP flow typically operates on plain text, i.e. text isolated from formatting, that has been extracted from source documents in file formats such as .doc, .docx, .html, .pdf, .rtf files and the like. The data ingestion stage of the flow is responsible for identifying the plain text within the source documents, oftentimes leaving behind the associated metadata, which may include formatting information (e.g. underlining, bold text, strikethrough text, subscripts and superscripts, just to name a few examples), embedded notes, and comments. The present invention proposes a system that incorporates metadata identifying formatting characteristics of the identified plain text of original file formats to enhance the NLP results, as further exemplified herein.

Figure 1:
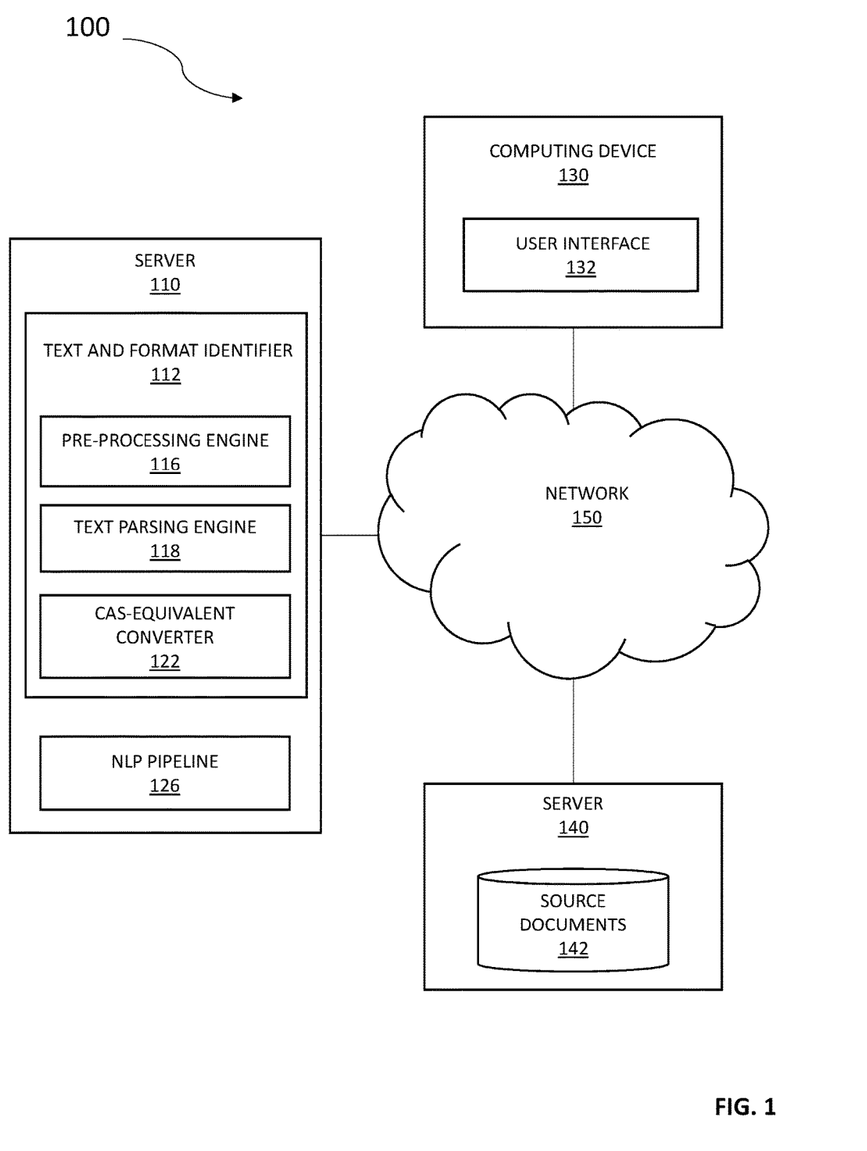
FIG. 1 is a block diagram illustrating a text and format identifying environment, in accordance with an embodiment of the present invention.

FIG. 1 illustrates a text and formatting identifying environment 100, which comprises server 110, server 140, and computing device 130 all connected via network 150.

In the example embodiment, network 150 is a communication channel capable of transferring data between connected devices. In the example embodiment, network 150 may be a telecommunications network used to facilitate telephone calls between two or more parties comprising a landline network, a wireless network, a closed network, a satellite network, or any combination thereof. In another embodiment, network 150 may be the Internet, representing a worldwide collection of networks and gateways to support communications between devices connected to the Internet. In this other embodiment, network 150 may include, for example, wired, wireless, or fiber optic connections which may be implemented as an intranet network, a local area network (LAN), a wide area network (WAN), or any combination thereof. In further embodiments, network 150 may be a Bluetooth network, a WiFi network, or a combination thereof. In general, network 150 can be any combination of connections and protocols that will support communications between computing device 130, server 110, and server 140. In general, network 150 can be any combination of connections and protocols that will support communications between server 110, computing device 130, and server 140.

In various embodiments of the present invention, computing device 130 includes user interface 132 and may be a laptop computer, tablet computer, netbook computer, personal computer (PC), a desktop computer, a personal digital assistant (PDA), a smart phone, or any programmable electronic device capable of communicating with server 110 and server 140 via network 150. Computing device 130 may include internal and external hardware components, as depicted and described in further detail below with reference to FIG. 3. In other embodiments, computing device 130 may be implemented in a cloud computing environment, as described in relation to FIGS. 4 and 5, herein.

In the example embodiment, user interface 132 is a computer program which allows a user to interact with computing device 130 and other connected devices via network 150. For example, user interface 132 may be a graphical user interface (GUI). In addition to comprising a computer program, user interface 132 may be connectively coupled to hardware components, such as those depicted in FIG. 3, for receiving user input. In the example embodiment, user interface 132 is a web browser, however in other embodiments user interface 132 may be a different program capable of receiving user interaction and communicating with other devices.

In the example embodiment, server 140 comprises source documents 142 and may be a laptop computer, tablet computer, netbook computer, personal computer (PC), a desktop computer, a personal digital assistant (PDA), a smart phone, or any programmable electronic device capable of communicating with server 110 and computing device 130 via network 150.

In the example embodiment, source documents 142 is a corpora of documents which detail annotated bodies of subject specific data, such as medical, legal, and financial data. Documents within source documents 142 may be structured, i.e. include metadata, or unstructured and are written in programming languages of common file formats such as .docx, .doc, .pdf, .rtf, etc. In further embodiments, source documents 142 may include handwritten or documents scanned into electronic form which have no associated metadata.

Server 110 includes text and format identifier 112 as well as NLP pipeline 126. Server 110 may be a laptop computer, tablet computer, netbook computer, personal computer (PC), a desktop computer, a personal digital assistant (PDA), a smart phone, or any programmable electronic device capable of communicating with server 140 and computing device 130 via network 150.

In the example embodiment, NLP pipeline 126 is a software application which is capable of receiving, analyzing, and understanding natural human language. In the example embodiment, NLP pipeline 126 comprises dictionaries, rules, statistical models, relational databases, and semantic rules in order to make a meaningful text analysis of data, such as the data contained in source documents 142. NLP pipeline 126 is made up of several components. In several parlances, these components are called "annotators", since they annotate meaning to a span of text. The annotators include an annotation type, a span ("covered text"), and potentially other attributes, enough to tell you what is interesting (or relevant), where it is located, and why it is interesting (or relevant). In order to develop highly precise annotators that could handle these various formatting constructs, the annotators would have to be developed specifically to understanding the text format code/language.

Text and format identifier 112 comprises pre-processing engine 116, text parsing engine 118, and CAS-equivalent (common analysis structure-equivalent) converter 122. In the example embodiment, text and format identifier 112 is capable of utilizing the aforementioned components, and more specifically pre-processing engine 116, to identify a file format of the documents contained in source documents 142. In addition, text and format identifier 112, and more particularly text parsing engine 118, is capable of identifying plain text and formatting within source documents 142. Furthermore, text and format identifier 112, and specifically CAS-equivalent convert 122, is capable of converting the identified formatting to a CAS-equivalent structure and transmitting the identified plain text and formatting to NLP pipeline 126. In the example embodiment, where text and format identifier 112 is located on server 110, text and format identifier 112 is accessed by an end user remotely via user interface 132 and network 150. In other embodiments, however, text and format identifier 112 may be a standalone program stored and accessed locally on computing device 130.

In the example embodiment, pre-processing engine 116 is a software program capable of analyzing structured and unstructured document data, such as data contained in source documents 142, and identifying a file format of the analyzed documents, for example .doc, .pdf, .html, and the like. In the example embodiment, pre-processing engine 116 identifies a file format by analyzing a file format extension associated with source documents 142, however in other embodiments pre-processing engine 116 may identify a file format alternatively.

In the example embodiment, text parsing engine 118 is capable of identifying each line of plain text within source documents 142 as well as identifying the formatting characteristics associated with the plain text, for example bold type. In the example embodiment, text parsing engine 118 is capable of identifying the plain text and formatting thereof in both structured and unstructured data/documents. In the example embodiment, text parsing engine 118 is capable of identifying plain text and corresponding formatting by analyzing program code associated with source documents 142. In embodiments involving unstructured source documents 142, text parsing engine 118 may use techniques, such as optical character recognition (OCR), to identify formatting characteristics associated with the plain text of handwritten or scanned document(s). Examples of formatting characteristics associated with plain text, structured or unstructured, include, bold, underline, strikethrough, comment annotations, subscripts, superscripts, strikethroughs, font colors, font sizes, font types, bold text, color fonts, underlined text, and the like. In further embodiments, unstructured source documents 142 may include voice to text metadata such as tone of voice, volume indicator, and so forth.

CAS-equivalent converter 122 is capable of denoting the span of the plain text associated with the formatting identified by text parsing engine 118. In the example embodiment, CAS-equivalent converter 122 denotes the span of the plain text associated with the formatting identified by text parsing engine 118 in a common analysis structure (CAS) programming language. In other embodiments, CAS-equivalent converter 122 may denote a span of plain text associated with formatting in other languages.

Figure 2:
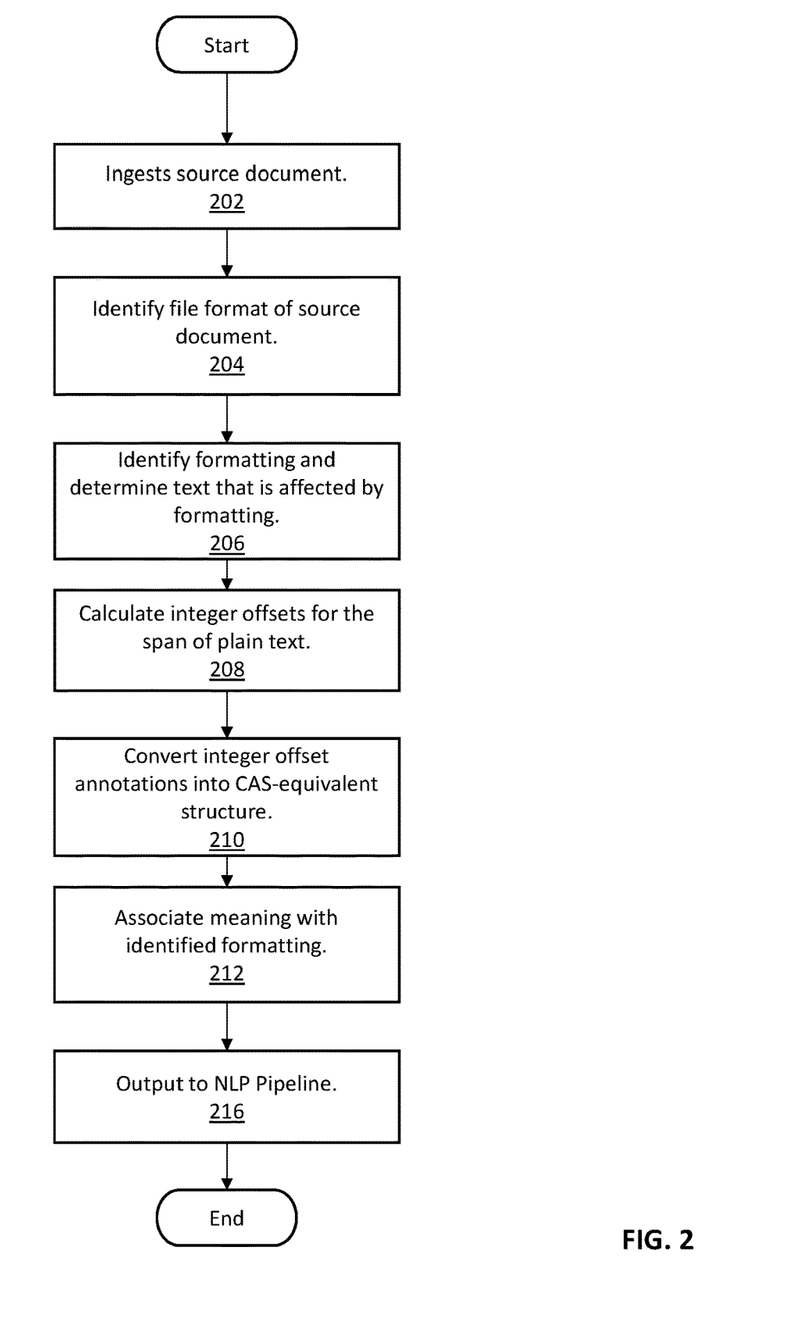
FIG. 2 is a flowchart depicting operational steps of text and format extractor of FIG. 1 in extracting formatting characteristics of documents for natural language processing, in accordance with an embodiment of the present invention.

FIG. 2 illustrates a flowchart depicting an embodiment of the present invention. The enhancement of the present invention over prior art includes identifying the formatting of the plain text of source documents 142 (FIG. 1) and taking into account the identified formatting when analyzing the data in a natural language processing pipeline. For example, the extracted data may comprise the following formatting characteristics: "This is of the utmost importance." The prior art does not identify the formatting metadata (e.g. underlining and italics) along with the plain text, thus outputting the following example text to NLP pipeline 126: "This is of the utmost importance." In effect, the identified data loses some of its characteristics (i.e. underlining and italics), which may be important to the meaning, interpretation, weighing and ranking of the identified data.

Referring now to FIGS. 1 and 2, text and format identifier 112 ingests source documents 142 (step 202). In the example embodiment, text and format identifier 112 ingests source documents 142 by way of receiving user input designating the location of source documents 142. For example, a user may utilize user interface 132 to link or map the location of source documents 142 such that text and format identifier 112 may reference, upload, and/or download the documents contained in source documents 142. In other embodiments, text and format identifier 112 may be configured otherwise, for example to automatically search within particular databases or directories for specific documents or file types. In the example embodiment, text and format identifier 112 is capable of receiving common document file types, for example .doc, .docx, .pdf, .html, .ppt, and the like. Moreover, text and format identifier 112 is further capable of receiving documents one at a time or in batch form.

With reference now to an illustrative example, a doctor seeking analysis of patient medical data links 500 patient files to text and format identifier 112 detailing new patient data (i.e. medical history, insurance information, known allergies, etc.), laboratory results, a patient prescription regimen, and/or scanned documents such as doctor's handwritten notes and printed email correspondence.

Text and format identifier 112 identifies file format of source documents 142 (step 204). Text and format identifier 112 determines a file format of source documents 142 by scanning source documents 142 for characteristics indicative of file format. In the example embodiment, text and format identifier 112, and more specifically pre-processing engine 116, identifies a file format by examining the file format extension associated with each of the files contained within source documents 142. For example, Microsoft Office Word documents (Microsoft Office is a registered trademark of Microsoft, Inc.®) often carry the file name extensions of ".doc" and ".docx" while hypertext markup language (html) documents often carry the file name extension ".html". In the example embodiment, text and format identifier 112 is capable of recognizing any file format for which it is trained to recognize. In other embodiments, text and format identifier 112 may identify a file format differently, for example by searching the document for file format specific elements, such as containers, objects, and the like.

With reference again to the illustrative example enumerated above, if text and format identifier 112 scans the file extensions of the uploaded 500 patient files, then text and format identifier 112 determines that 250 of the files end in .doc and are in a MS Word format (structured), 125 of the files end in .pdf and are in an Adobe file format (unstructured), 100 of the files end in .html and are in hypertext markup language format (structured), and the remaining 25 files end in .jpeg and are in compressed image format (unstructured).

Text and format identifier 112 identifies formatting characteristics of the scanned documents and determines which of the plain text is affected by the identified formatting characteristics (step 206). In the example embodiment, text and format identifier 112, and more specifically text parsing engine 118, examines the identified program code corresponding to source documents 142 for formatting characteristic denotations corresponding to the plain text. For example, formatting of html documents is denoted within metatags comprising a start tag "< >" and an end tag </>", for example <b> This is some bold text.</b> indicates that the text within the tags is bold. Similarly, a rich text format (RTF) document may contain control words followed by special characters (i.e. This is some {\b bold} text.) to indicate when a character and/or word is bold. In the example embodiment, text parsing engine 118 is trained to identify formatting characteristics for many of the most common file formats, such as .doc, .pdf, .xls, and .html. Moreover, text parsing engine 118 is further trained to identify many of the most common formatting characteristics such as subscripts, superscripts, strikethroughs, font colors, font sizes, font types, bold types, italicized text or underlined text, etc.

With reference again to the illustrative example above, if text and format identifier 112 examines program code of one of the uploaded html documents and determines that the plain text "allergic to penicillin" within the clause "patient is allergic to penicillin" is associated with a metatag denoting bold, then text and format identifier 112 identifies the plain text "allergic to penicillin" as bold.

Moreover, in embodiments wherein text and format identifier 112 identifies a file format commonly associated with hand written and/or scanned source documents 142, i.e. unstructured data, text and format identifier 112 may be configured to utilize optical character recognition (OCR) to identify formatting characteristics of the handwritten and/or scanned documents (step 206 continued). Utilizing OCR, text and format identifier 112 may determine if a span of text is "bold type" by comparing the pixel thickness of the characters to an average pixel thickness of the entire document. Similarly, text and format identifier 112 may determine if a span of text is "italics type" by analyzing the angle of the pixels of the characters in a span of text. Further, text and format identifier 112 may determine if a span of text is "underlined" by analyzing the number of pixels in a consistent horizontal line underneath a span of text. In other embodiments, text and format identifier 112 may identify the formatting characteristics associated with plain text of source documents 142 via other means. Other examples of formatting characteristics include subscripts, superscripts, strikethroughs, font colors, font sizes, font types, bold types, italicized text or underlined text, in accordance with an embodiment of the present invention.

With reference again to the illustrative example used above, if text parsing engine 118 identifies a doctor's scanned handwritten file note as being in a .pdf file format, which is associated with scanned documents, then text and format identifier 112 utilizes OCR to determine that the clause "allergic to penicillin" consists of pixels thicker than an average pixel thickness of the entire document and as such identifies the clause as being bold type. Moreover, OCR is used to identify other formatting characteristics of scanned handwritten notes, for example if one of the uploaded scanned documents contains a numerical character located slightly below the line of plain text, then text and format identifier 112 utilizes OCR to identify the numerical character as being a subscript.

Text and format identifier 112 calculates integer offsets denoting the span of plain text modified by the identified formatting characteristics (step 208). In the example embodiment, text and format identifier 112, and more specifically CAS-equivalent converter 122, identifies the span of plain text modified by the identified formatting characteristics and applies a numerical integer denoting the beginning and end of the identified formatting characteristic(s). In embodiments where ingested source documents 142 are delineated by character reference, i.e. successive lines continue sequentially from the last character of the previous line (i.e. line 1 contains characters 1-100 and line 2 contains characters 101-200, and so forth), text and format identifier 112 identifies the span of plain text modified by formatting characteristics by denoting both the page number as well as the beginning character and end character of the span of plain text that is modified. In other embodiments, source documents 142 may be delineated by line, page number, and character offset numbers, or in any other format that text and format identifier 112 is configured.

Referencing the illustrative example introduced above, if an ingested html document contains the clause "Patient is <bold>allergic to penicillin.</bold>.", then text and format identifier 112 determines that the bold type formatting begins at character 12 and ends at character 34, and may be denoted in the CAS-equivalent structure as BoldAnnotation<12, 34>.

Text and format identifier 112 converts integer offset annotations into CAS-equivalent structure (step 210). In the example embodiment, text and format identifier 112, and more specifically CAS-equivalent converter 122, converts the span of plain text, denoted by the character integer offsets at the beginning and end of the identified formatting characteristic(s), into CAS-equivalent structures. The CAS-equivalent structure may denote the page number, line number, and numerical character offsets of the span of plain text containing formatting characteristics. Alternatively, the CAS-equivalent structure may just denote the page number and numerical character offsets of the span of plain text containing formatting characteristics. In other embodiments, text and format identifier 112 may denote, via alternative data structure formats, where formatting characteristics modify plain text.

Text and format identifier 112 associates meaning with the identified formatting of the plain text of the source document (step 212). In the example embodiment, meaning is associated with formatting to infer an intent of the writer and aid in associating importance with data contained in source documents 142. In the example embodiment, text and format identifier 112 may identify subscripts and superscripts in a chemical formula (e.g. $H_2O$, $CO_2$), bold type text (e.g. Section 3), underlined text (e.g. This is of the utmost importance), strikethrough text (e.g., and italics (e.g. Pay attention to this sentence.), as just a few examples. In the example embodiment, text and format identifier 112 may characterize strike-through text to mean "NOT" or a negation, underlined, italics, and/or bold text may mean more emphasis, a higher priority or higher/more certain modality, subscripts may be associated with a chemical formula, superscripts may be associated with a mathematical formula, and the like. Moreover, meanings associated with the identified formatting may be weighed to indicate importance. For example, bold, italics, and/or underlined text may be prioritized over text that is struck through. Furthermore, certain formatting can be ignored, or categorized as irrelevant, in order to save processing resources, i.e. strikethrough. In the example embodiment, a span of natural language text including bold type, underline text, and/or italics may be associated with emphasis/importance. Further, the span of natural language text including bold type, underline text, and/or italics may be ranked in order of importance based on bold type having more emphasis than underline text and/or italics. For example, "Patient is allergic to penicillin" may take priority over "Patient is allergic to penicillin" or "Patient is allergic to penicillin." In other embodiments, the order of importance may be configured in any order that the program is configured to rank them.

With reference again to the illustrative example above, if text and format identifier 112 detects bold text formatting in "Patient is allergic to penicillin.", then it will associate the span of bold text "allergic to penicillin" with emphasis/importance. Moreover, if other plain text within the source document contains an instance of strikethrough text for example, then the strikethrough text may be disregarded or categorized as irrelevant. Additionally, text and format identifier 112 may be configured to rank identified bold text as a higher priority item for analysis over strikethrough text or underlined text.

Text and format identifier 112 outputs stored CAS-equivalent structures derived from source documents 142 to NLP pipeline 126 (step 216). In the example embodiment, NLP pipeline 126 receives the plain text, formatting thereof, and meanings associated with the formatting to both identify a meaning of the plain text as well as infer an emphasis or importance of the plain text meaning based on the corresponding formatting. In the example embodiment, text and format identifier 112 transmits the formatting to NLP pipeline 126 in CAS-equivalent structure, however in other embodiments the identified formatting may be in other programming languages.

With reference to the illustrative example above, if text and format identifier 112 outputs "Patient is allergic to penicillin." BoldAnnotation<12, 34> then NLP pipeline 126 associates the span of bold text "allergic to penicillin" with emphasis/importance.

Referring now generally to embodiments of the invention, a method for processing natural language text may be performed by one or more of the following functions.

According to an embodiment, the method for processing natural language text may comprise ingesting, by a natural language parsing engine, a set of natural language text data in a formatted markup code/language. For example, a website article describing the results of a clinical trial for a new cholesterol drug may be ingested in its source HTML format. The website article may be composed of structured data together with rich text metadata comprising subscripts, superscripts, bold text, and/or underlined text.

According to an embodiment, a computer-implemented method for processing text determines that a natural language text is associated with one or more formatting characteristics. For example, the method may receive natural language text as input. The natural language text may have formatting characteristics such as bold type, underline, strikethrough, or the like. Where the natural language text is received as structured data (such as in an HTML document), determining its associated formatting characteristic may be done by scanning the document and locating meta tags that define text formatting characteristics. For example, in an HTML file, a portion of text can be encapsulated in a pair of <bold></bold> meta tags. A browser displaying this text will display it in bold type. The bold type can be said to be a formatting characteristic of the portion of text; i.e., it is associated with the portion of text. The portion of text may have more than one formatting characteristic. For example, it can be both bold and underlined. It should be noted that the described mechanism for determining the formatting characteristic of a portion of text is exemplary. Other mechanisms are contemplated, and may include, for example, using OCR to process unstructured data.

The method also determines a span of the natural language text that corresponds to the one or more formatting characteristics. The span of natural language text generally refers to a portion of the text to which the formatting characteristic applies. For example, in a text stream having 100 characters, characters 1-5 may correspond to a word that has bold type formatting. In this example, the span of the bold type formatting characteristic is 1-5. The same formatting characteristic may apply to more than one span of text. For example, the text stream may include multiple discontinuous character sets, each of which is bold. Other metrics can be used to identify the span of text. For example, the span may refer to sections within a document (such as chapter, page, or line numbers).

The method generates a data structure for storage in memory. The data structure includes at least one of the one or more formatting characteristics, and a corresponding span of the natural language text. In one example, the data structure may be a CAS file, or appended to a CAS file. For example, the data structure may be BoldAnnotation<12, 34>; this signifies that characters 12 through 34 of the input text are in bold type.

According to a further embodiment, the method also transmits the generated data structure to a natural language processing (NLP) pipeline. The generated data structure includes the at least one of the one or more formatting characteristics and the corresponding span of the natural language text. For example, the method itself may be a particular processing stage within a larger NLP pipeline. The generated data structure, in this example, is an output of the particular processing stage. This output may serve as an input to another processing stage in the pipeline.

According to a further embodiment, the method transmits the generated data structure to an NLP pipeline that includes a Question and Answer (QA) pipeline. The QA pipeline receives input text that includes a question and analyzes the question based on the at least one of the one or more formatting characteristics and the corresponding span of the natural language text in the question. For example, if the span of the natural language text in the question contains strikethrough text, then the method may categorize the strikethrough text as irrelevant and analyze the non-strikethrough text in the question to develop an answer. In other embodiments, the method may weigh, or rank, multiple instances of formatting characteristics within a span of the natural language text in the question, such as bold type and italics, to consider emphasis on bold type words over italics, for example, in natural language text to develop an answer.

According to another embodiment, the method transmits the generated data structure to an NLP pipeline that includes a relationship extraction pipeline. The relationship extraction pipeline incorporates the generated data structure, which includes at least one of the one or more formatting characteristics and the corresponding span of the natural language text, into its detection and classification of semantic relationships within a natural language text analysis. For example, if the relationship extraction pipeline detects the following span of natural language text, "Patient is allergic to penicillin", then the underlined span of natural language text "allergic to penicillin" is detected by the relationship extraction pipeline and classified as emphasized natural language text within a natural language text analysis.

According to another embodiment, the method transmits the generated data structure to an NLP pipeline that includes a machine learning pipeline. The machine learning pipeline incorporates the generated data structure, which includes at least one of the one or more formatting characteristics and the corresponding span of the natural language text, into its construction of algorithms that learn from and make predictions on natural language text data. For example, the machine learning pipeline uses the generated data structure to emphasize a concept in a span of text that may be bold type or underlined, or to categorize a span of text that includes subscripts as a chemical formula. It may be said that machine learning is improved, or refined, as a result of constructing algorithms that include the aforementioned generated data structures.

According to another embodiment, the method transmits the generated data structure to an NLP pipeline that includes a syntax tree parsing pipeline. The syntax tree parsing pipeline incorporates the generated data structure, which includes at least one of the one or more formatting characteristics and the corresponding span of the natural language text, into its construction of parse trees for sentences in natural language text.

According to another embodiment, the method transmits the generated data structure to an NLP pipeline that includes a syntax tree parsing pipeline. The syntax tree parsing pipeline incorporates the generated data structure, which includes at least one of the one or more formatting characteristics and the corresponding span of the natural language text, into its construction of parse trees for sentences in natural language text.

According to another embodiment, the method transmits the generated data structure to an NLP pipeline that includes a text mining pipeline. The text mining pipeline incorporates the generated data structure, which includes at least one of the one or more formatting characteristics and the corresponding span of the natural language text, into its text mining analytics.

According to a further embodiment, the generated data structure includes a common analysis structure (CAS). A CAS depicts at least one of the one or more formatting characteristics and the corresponding span of the natural language text that it belongs to, such as: "Patient is allergic to penicillin" BoldAnnotation<12, 24>. Other embodiments may include data structures in other programming formats, besides CAS, which also depict at least one of the one or more formatting characteristics and the corresponding span of the natural language text that it belongs to.

According to a further embodiment, the method generates a data structure for storage in memory that includes generating the data structure as a CAS structure and appending the CAS structure to a CAS file. For example, the CAS structure includes at least one of the one or more formatting characteristics and the corresponding span of the natural language text, and may appear as follows: "Patient is allergic to penicillin" BoldAnnotation<12, 24>. The CAS file is a type of program file that contains the CAS structure.

According to an embodiment, a computer-implemented method for processing text determines that a natural language text, associated with one or more formatting characteristics, is structured. For example, the determining of structured natural language text may be done by scanning the input document and identifying file format extensions such as .html, .rdf, .rtf, or the like. The method may be configured to recognize various file formats and identify its structured natural language text associated with one or more formatting characteristics.

The method also identifies the one or more formatting characteristics by identifying formatting meta tags associated with the natural language text. For example, an HTML file may include a portion of text that is encapsulated in a pair of <bold></bold> meta tags. The bold type can be said to be a formatting characteristic of the portion of text within the pair of meta tags; i.e., it is associated with the portion of text.

According to an embodiment, a computer-implemented method for processing text determines that a natural language text, associated with one or more formatting characteristics, is unstructured. For example, the determining of unstructured natural language text may be done by scanning the input document and identifying an absence of file format extensions such as .html, .rdf, .rtf, or the like. Other embodiments of identifying unstructured natural language text associated with one or more formatting characteristics may be by way of identifying pixel makeup of the characters within an input document.

The method also identifies the one or more formatting characteristics of the natural language text by applying optical character recognition (OCR) to the natural language text. For example, a span of text may be identified as "bold type" by comparing the pixel thickness of the characters to an average pixel thickness of the entire document. Similarly, the method may determine if a span of text is "italics type" by analyzing the angle of the pixels of the characters in a span of text.

According to a further embodiment, a computer-implemented method associates the one or more formatting characteristics with one or more actions. For example, the method categorizes a span of natural language text as irrelevant when it is associated with a strikethrough formatting characteristic.

According to a further embodiment, the method emphasizes a span of natural language text when it is associated with an underline formatting characteristic. Generally, emphasis in this context refers to treating a span of emphasized text in a special way relative to other text that is not emphasized. For example, in a variety of NLP workloads, emphasized text may be given priority over non-emphasized text. In one non-limiting example, a piece of text may be a data set having a series of elements; for example, a set of tree types found in a forest. These tree types could be {t1, t2, t3, t4}. In this example, t2 appears in bold. This formatting characteristic emphasizes t2 relative to other tree types in the dataset. In this context, this emphasis may signify that t2 is more common in the forest than the other tree types. How the property of emphasis should be interpreted depends on the embodiment of the invention; it may be implemented in various stages of the NLP pipeline that may treat emphasized text differently than non-emphasized text.

According to a further embodiment, the method emphasizes a span of natural language text when it is associated with a bold type formatting characteristic.

According to a further embodiment, the method emphasizes a span of natural language text when it is associated with an italics formatting characteristic.

According to a further embodiment, the method categorizes a span of natural language text as a chemical formula when it is associated with a subscript formatting characteristic.

According to a further embodiment, the method categorizes a span of natural language text as a mathematical formula when it is associated with a superscript formatting characteristic.

According to a further embodiment, a computer-implemented method performs the one or more actions associated with the identified at least one formatting characteristic. For example, the method categorizes as irrelevant the span of natural language text associated with a strikethrough formatting characteristic, and so forth.

According to a further embodiment, a computer implemented method ranks the one or more actions associated with the identified at least one formatting characteristic. For example, the span of natural language text including bold type, underline text, and/or italics may be ranked in order of importance based on bold type having more emphasis than underline text and/or italics. For example, "Patient is allergic to penicillin" may take priority over "Patient is allergic to penicillin" or "Patient is allergic to penicillin." In other embodiments, the order of importance may be configured in any order that the program is configured to rank them.

Figure 3:
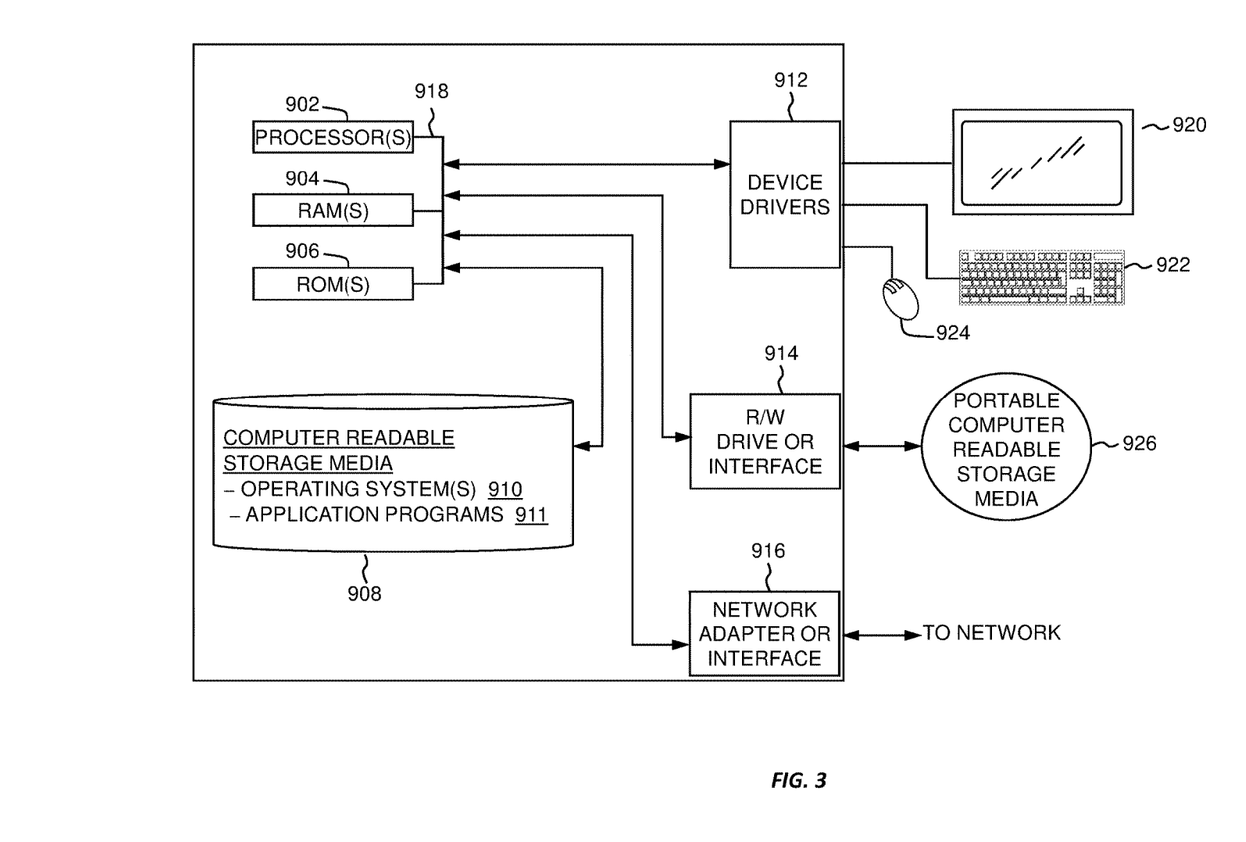
FIG. 3 is a block diagram depicting the hardware components of the text and format identifying environment of FIG. 1, in accordance with an embodiment of the present invention.

FIG. 3 depicts a block diagram of components of computing device 130 (FIG. 1), in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as text and format identifier 112, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 130 may also include a R/W drive or interface 914 to read from and write to one or more portable computer readable storage media 926. Application programs 911 on computing device 130 may be stored on one or more of the portable computer readable storage media 926, read via the respective R/W drive or interface 914 and loaded into the respective computer readable storage media 908.

Computing device 130 may also include a network adapter or interface 916, such as a TCP/IP adapter card or wireless communication adapter (such as a 4G wireless communication adapter using OFDMA technology). Application programs 911 on computing device 130 may be downloaded to the computing device from an external computer or external storage device via a network (for example, the Internet, a local area network or another wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
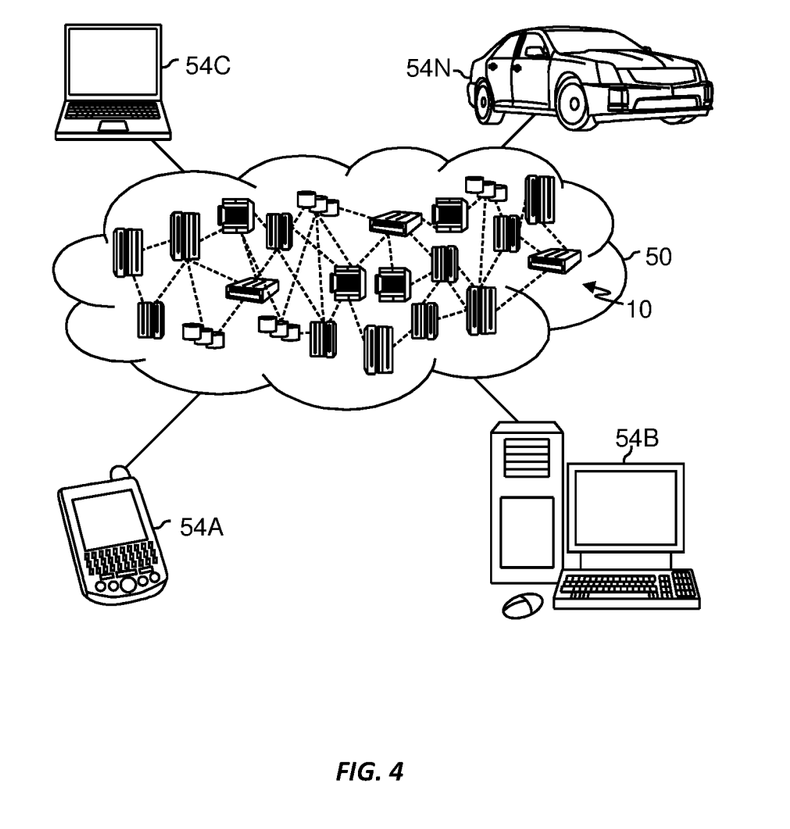
FIG. 4 is a diagram depicting a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
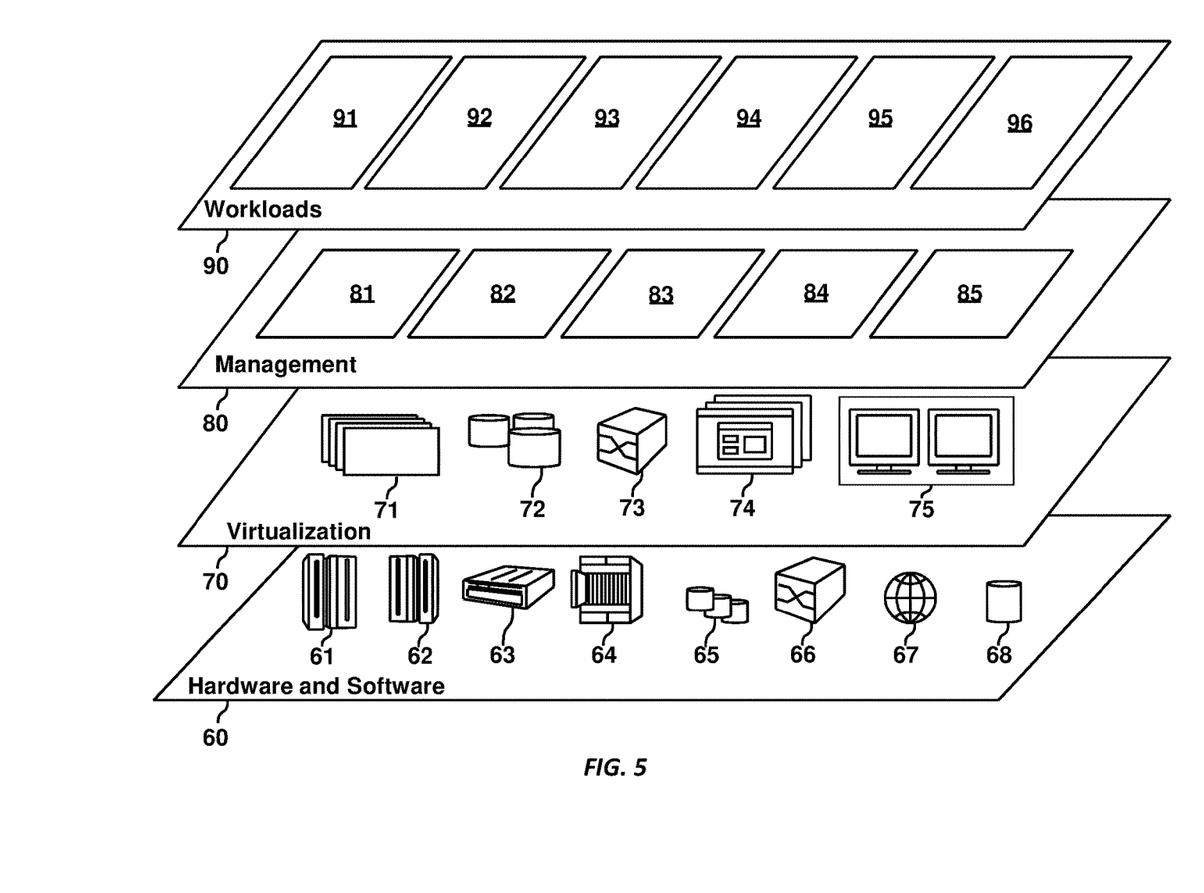
FIG. 5 is a diagram depicting abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and text and format identification processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method for processing text, the method comprising:
  determining, by a computer, that a span of natural language text is associated with one or more formatting characteristics;
  applying, by the computer, optical character recognition (OCR) to the span of natural language text associated with the one or more formatting characteristics, wherein
  identifying, by the computer, that the span of the natural language text is bold type by comparing the pixel thickness of the characters of the span of the natural language text to an average pixel thickness of the natural language text;
  identifying, by the computer, that the span of the natural language text is italics type by analyzing the angle of the pixels of the characters in the span of the natural language text;
  identifying, by the computer, that the span of the natural language text is underlined by analyzing the number of pixels in a consistent horizontal line underneath the characters in the span of the natural language text;
  identifying, by the computer, that the span of the natural language text is a subscript by recognizing that a numerical character is located slightly below the span of the natural language text;
  calculating, by the computer, integer offsets denoting the span of natural language text modified by the identified formatting characteristics;
  applying, by the computer, numerical integer offsets denoting a beginning and an end of the identified formatting characteristics;
  denoting, by the computer, a page number as well as a beginning character and an end character of the span of natural language text that is modified;
  converting, by the computer, the span of natural language text, denoted by the numerical integer offsets at the beginning and the end of the identified formatting characteristics, into a common analysis structure (CAS);
  generating, by the computer, a data structure for storage in memory comprising at least one of the one or more formatting characteristics, and a corresponding span of the natural language text, wherein the data structure comprises the CAS;
  appending, by the computer, the CAS to a CAS file;
  transmitting, by the computer, the generated CAS comprising the at least one of the one or more formatting characteristics and the corresponding span of the natural language text to a natural language processing (NLP) pipeline to identify an intent of the corresponding span of the natural language text;
  performing, by the computer, the one or more actions associated with the one or more formatting characteristics;
  associating, by the computer, a level of importance with the corresponding span of the natural language text based on the at least one of the one or more formatting characteristics, wherein the level of importance for the at least one of the one or more formatting characteristics is pre-configured;
  ranking, by the computer, the one or more actions associated with the identified one or more formatting characteristics, wherein bold type is ranked as more important than underline text; and
  incorporating, by the computer, the generated CAS data structure into a machine learning model that learns from and makes predictions on natural language text data.

2. The method of claim 1, wherein the NLP pipeline comprises a Question and Answer (QA) pipeline, and wherein the input text comprises a question, the QA pipeline analyzing the question based on the at least one of the one or more formatting characteristics and the corresponding span of the natural language text in the question.

3. The method of claim 1, wherein the NLP pipeline comprises a relationship extraction pipeline, the relationship extraction pipeline incorporating the generated data structure into its detection and classification of semantic relationships within a natural language text analysis.

4. The method of claim 1, wherein the NLP pipeline comprises a syntax tree parsing pipeline, the syntax tree parsing pipeline incorporating the generated data structure into its construction of parse trees for sentences in natural language text.

5. The method of claim 1, wherein the NLP pipeline comprises a text mining pipeline, the text mining pipeline incorporating the generated data structure into its text mining analytics.

6. The method of claim 1, wherein determining, by a computer, that a natural language text is associated with one or more formatting characteristics comprises:
  determining, by the computer, that the natural language text is structured; and
  identifying the one or more formatting characteristics by identifying formatting meta tags associated with the natural language text.

7. The method of claim 1, further comprising:
  associating, by the computer, the one or more formatting characteristics with one or more actions, the one or more actions comprising any one of:
  categorizing as irrelevant the span of natural language text associated with a strikethrough formatting characteristic;
  emphasizing the span of natural language text associated with an underline formatting characteristic;
  emphasizing the span of natural language text associated with a bold type formatting characteristic;
  emphasizing the span of natural language text associated with an italics formatting characteristic;
  categorizing as a chemical formula the span of natural language text associated with a subscript formatting characteristic; and
  categorizing as a mathematical formula the span of natural language text associated with a superscript formatting characteristic.

8. The method of claim 7, further comprising:
  ranking, by the computer, the action associated with the identified at least one formatting characteristic.

9. A computer program product for processing text, comprising a non-transitory tangible storage device having program code embodied therewith, the program code executable by a processor of a computer to perform a method, the method comprising:
  determining, by a processor, that a span of natural language text is associated with one or more formatting characteristics;
  applying, by the processor, optical character recognition (OCR) to the span of natural language text associated with the one or more formatting characteristics, wherein
    identifying, by the processor, that the span of the natural language text is bold type by comparing the pixel thickness of the characters of the span of the natural language text to an average pixel thickness of the natural language text;
    identifying, by the processor, that the span of the natural language text is italics type by analyzing the angle of the pixels of the characters in the span of the natural language text;
    identifying, by the processor, that the span of the natural language text is underlined by analyzing the number of pixels in a consistent horizontal line underneath the characters in the span of the natural language text;
    identifying, by the processor, that the span of the natural language text is a subscript by recognizing that a numerical character is located slightly below the span of the natural language text;
  calculating, by the processor, integer offsets denoting the span of natural language text modified by the identified formatting characteristics;
  applying, by the processor, numerical integer offsets denoting a beginning and an end of the identified formatting characteristics;
  denoting, by the processor, a page number as well as a beginning character and an end character of the span of natural language text that is modified;
  converting, by the processor, the span of natural language text, denoted by the numerical integer offsets at the beginning and the end of the identified formatting characteristics, into a common analysis structure (CAS);
  generating, by the processor, a data structure for storage in memory comprising at least one of the one or more formatting characteristics, and a corresponding span of the natural language text, wherein the data structure comprises the CAS;
  appending, by the processor, the CAS to a CAS file;
  transmitting, by the processor, the generated CAS comprising the at least one of the one or more formatting characteristics and the corresponding span of the natural language text to a natural language processing (NLP) pipeline to identify an intent of the corresponding span of the natural language text;
  performing, by the processor, the one or more actions associated with the one or more formatting characteristics;
  associating, by the processor, a level of importance with the corresponding span of the natural language text based on the at least one of the one or more formatting characteristics, wherein the level of importance for the at least one of the one or more formatting characteristics is pre-configured;
  ranking, by the processor, the one or more actions associated with the identified one or more formatting characteristics, wherein bold type is ranked as more important than underline text; and
  incorporating, by the processor, the generated CAS data structure into a machine learning model that learns from and makes predictions on natural language text data.

10. A computer system, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
  determining, by a computer, that a span of natural language text is associated with one or more formatting characteristics;
  applying, by the computer, optical character recognition (OCR) to the span of natural language text associated with the one or more formatting characteristics, wherein identifying, by the computer, that the span of the natural language text is bold type by comparing the pixel thickness of the characters of the span of the natural language text to an average pixel thickness of the natural language text;

identifying, by the computer, that the span of the natural language text is italics type by analyzing the angle of the pixels of the characters in the span of the natural language text;

identifying, by the computer, that the span of the natural language text is underlined by analyzing the number of pixels in a consistent horizontal line underneath the characters in the span of the natural language text;

identifying, by the computer, that the span of the natural language text is a subscript by recognizing that a numerical character is located slightly below the span of the natural language text;

calculating, by the computer, integer offsets denoting the span of natural language text modified by the identified formatting characteristics;

applying, by the computer, numerical integer offsets denoting a beginning and an end of the identified formatting characteristics;

denoting, by the computer, a page number as well as a beginning character and an end character of the span of natural language text that is modified;

converting, by the computer, the span of natural language text, denoted by the numerical integer offsets at the beginning and the end of the identified formatting characteristics, into a common analysis structure (CAS);

generating, by the computer, a data structure for storage in memory comprising at least one of the one or more formatting characteristics, and a corresponding span of the natural language text, wherein the data structure comprises the CAS;

appending, by the computer, the CAS to a CAS file;

transmitting, by the computer, the generated CAS comprising the at least one of the one or more formatting characteristics and the corresponding span of the natural language text to a natural language processing (NLP) pipeline to identify an intent of the corresponding span of the natural language text;

performing, by the computer, the one or more actions associated with the one or more formatting characteristics;

associating, by the computer, a level of importance with the corresponding span of the natural language text based on the at least one of the one or more formatting characteristics, wherein the level of importance for the at least one of the one or more formatting characteristics is pre-configured;

ranking, by the computer, the one or more actions associated with the identified one or more formatting characteristics, wherein bold type is ranked as more important than underline text; and incorporating, by the computer, the generated CAS data structure into a machine learning model that learns from and makes predictions on natural language text data.

11. The method of claim 1, further comprising:

ingesting, by the computer, one or more source documents, wherein the one or more source documents comprise voice to text metadata, and wherein the voice to text metadata includes a tone of voice and a volume indicator.

\* \* \* \* \*